United States Patent
Dean

[11] 3,875,254
[45] *Apr. 1, 1975

[54] BLOCK COPOLYMERS OF SILICONES WITH VINYL PYRIDINE

[75] Inventor: John W. Dean, Averill Park, N.Y.

[73] Assignee: General Electric Company, New York, N.Y.

[ * ] Notice: The portion of the term of this patent subsequent to June 27, 1989, has been disclaimed.

[22] Filed: Dec. 29, 1971

[21] Appl. No.: 213,821

Related U.S. Application Data

[63] Continuation-in-part of Ser. No. 26,081, April 6, 1970, Pat. No. 3,673,272.

[52] U.S. Cl............... 260/827, 8/115.6, 8/DIG. 1, 117/123 D, 117/126 GN, 117/132 BS, 117/139.5 A, 252/500, 252/DIG. 2, 260/825, 260/DIG. 16
[51] Int. Cl......................... C08f 33/08, C08g 47/10
[58] Field of Search....................... 260/827, 88.3 R

[56] References Cited
UNITED STATES PATENTS

| | | | |
|---|---|---|---|
| 2,484,430 | 10/1949 | Sprague et al.............. | 260/88.3 |
| 3,673,272 | 6/1972 | Dean........................... | 260/827 |
| 2,955,093 | 10/1960 | Solomon...................... | 260/88.3 |
| 3,125,550 | 3/1964 | Laakso et al................. | 260/88.3 |

Primary Examiner—Wilbert J. Briggs, Sr.
Attorney, Agent, or Firm—Donald J. Voss, Esq.; E. Philip Koltos, Esq.; Frank L. Neuhauser

[57] ABSTRACT

Block copolymers of silicones with vinyl pyridine having the formula:

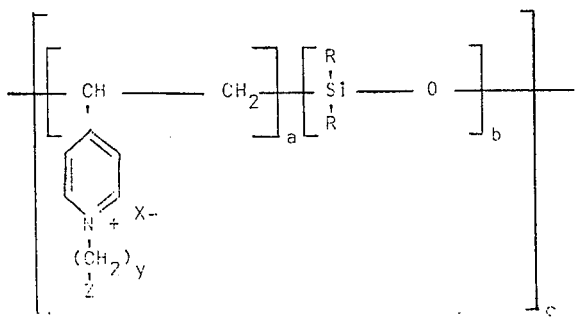

where $a$ is at least 25, $b$ is at least 10, $c$ is 1 or more, and R is selected from monovalent hydrocarbon radicals, $y$ is a whole number that varies from 1 to 12 and Z is an organo-functional substituent compatible with the vinyl pyridine system, and where X is a radical selected from the class consisting of chlorine, fluorine, iodine and bromine. The materials are useful for the formation of permselective membranes and allow the solubilization of silicones in a polar solvent.

8 Claims, No Drawings

3,875,254

BLOCK COPOLYMERS OF SILICONES WITH VINYL PYRIDINE

The present application is a continuation-in-part of present application Ser. No. 26,081, filed on Apr. 6, 1970, now U.S. Pat. No. 3,673,272, issued June 27, 1972.

BACKGROUND OF THE INVENTION

Copolymers of organopolysiloxanes with various materials have previously been formed. Included among these materials are block copolymers of organopolysiloxanes with resinous materials, such as polystyrene. In general, such materials have been formed for the peculiar surface-active properties which the copolymers possess.

However, to date, organopolysiloxanes having reactive, polar blocks have not been prepared. Formation of such a block copolymer provides particular advantages because of the polarity of the reactive, polar block, compared with the non-polarity of the organopolysiloxane segment. Such materials would prove valuable as surfactants because of the combination of high and low polaritius and, employing vinyl pyridine as the block along with the organopolysiloxane, would prove useful as permselective membranes because of the ionic bonding which can be created.

SUMMARY OF THE INVENTION

In accordance with the present invention, block copolymers of organopolysiloxanes with vinyl pyridine have been formed, these block copolymers having the formula:

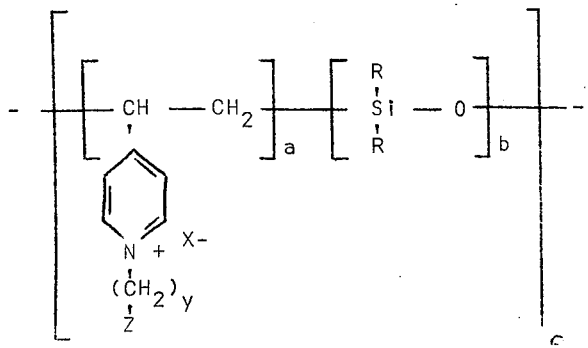

where each R is independently selected from non-halogenated non-acidic monovalent hydrocarbon radicals such as alkyl and aryl radicals selected from the class consisting of methyl and phenyl, $a$ is at least 25, $b$ is at least 10 and $c$ is 1 or more.

In the formula above, there are preferably at least 25 of the vinyl pyridine groups in each block, as indicated by the definition of $a$. Most preferably, there are from 50 to 500 of these units in each block. Similarly, while at least 10 diorganosiloxy units are present in each block, most preferably there are from 10 to 500 of these units in each block.

An effective copolymer is formed with a single block of vinyl pyridine units and a single block of diorganosiloxy units. However, improved results for many uses can be obtained by repeating blocks of these units and, preferably, there are from 3 to 10 repeats of vinyl pyridine and diorganosiloxy blocks. It is, of course, recognized that the length of each individual block within these recurring blocks is not necessarily equal.

Generally, the chain terminals of the block copolymer can be formed of a variety of substituents. For example, the chain terminal can be an alkali metal silanolate of formula $-SiR_2OM$, where M is the alkali metal and R is as previously defined. Additionally, the chain terminals can be reactive groups of the type generally employed in room temperature vulcanizing organopolysiloxane compositions, as are well known in the art.

DESCRIPTION OF THE PREFERRED EMBODIMENTS

As previously indicated, the block copolymers of the present invention may include those having single blocks of vinyl pyridine polymer and single blocks of diorganopolysiloxanes, or may contain repeating blocks of the vinyl pyridine polymer and diorganopolysiloxane. The first reference groups are those of formula:

1. A—B, where A represents the diorganopolysiloxane unit, and B represents the vinyl pyridine polymer segment. As indicated in the general formula, A represents repeating units of formula,

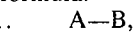

where each R is non-halogenated, non-acidic monovalent hydrocarbon radicals. The radical R has to be non-halogenated and non-acidic such that is will not react with the nitrogen atom or the pyridine ring. Preferably, R is selected from alkyl radicals, aryl radicals, cycloalkyl radicals, cycloalkenyl radicals, alkenyl radicals, aralkyl radicals, alkenyl radicals which radicals do not have more than 12 carbon atoms. More preferably, R is an alkyl or aryl radical of 6 carbon atoms or less, such as methyl and phenyl. As further indicated by the subscript $b$, there are at least 10 of these diorganosiloxy units in a group and, preferably, there are from 10 to 500 units in the organopolysiloxane block.

The organopolysiloxane portion of the block copolymer is formed by polymerization of cyclic organopolysiloxanes, such as hexamethylcyclotrisiloxane, octamethylcyclotetrasiloxane, decamethylpentasiloxane and hexaphenylcyclotrisiloxane. Preferably, when the substituents on the silicon atoms are methyl, the hexamethylcyclotrisiloxane is employed.

The vinyl pyridine portion of the block copolymer is formed through polymerization of vinyl pyridines of formula:

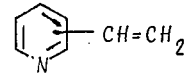

As indicated by the formula, the position of the vinyl group on the pyridine ring is not critical. For example, 2-vinyl pyridine and 4-vinyl pyridine can be equally effectively employed.

As indicated by the general formula, other polyvinyl pyridine-organopolysiloxane block copolymers can be formed, including those of formula ABA and $(ABA)_x$, where A and B are as previously defined, as indicated in the general formula. When compounds of the ABA and $(ABA)_x$ type are to be formed, reaction must start with preparation of the vinyl pyridine block of the copolymer.

The vinyl pyridine block is prepared in a solvent, preferably a mixture of tetrahydrofuran and toluene. With the tetrahydrofuran and toluene mixture, from 20 to 100% of the solvent is generally tetrahydofuran. In addition to these solvents, other solvents which may be employed include ethers, such as glyme and diglyme and aromatic hydrocarbons which are otherwise inert to the reaction. The difficulty with using ethers, other than tetrahydrofuran, is that there is more difficulty in purifying the final reaction mixture.

An alkali metal catalyst is employed to provide terminals on the vinyl pyridine polymer for bonding with the organopolysiloxane blocks. Preferably, the alkali metal is lithium and the compound is an organic alkali metal compound such as dilithium naphthalene. Other alkali metal organic compounds are shown, for example, in U.S. Pat. No. 2,975,160-Zelinski, issued Mar. 14. 1961. The lithium, or other alkali metal compound, must be one with two alkali metal constituents, in order to function most efficiently in the process. The dilithium organo compound reacts with the vinyl pyridine to form chains which are terminated with positively charged lithium ions. This vinyl pyridine chain, with the positively charged lithium ion terminals, may then be reacted with the silicone material to form the polyorganosiloxane blocks. Of course, when a block copolymer of form AB is to be produced, then the organolithium compound, or other organic compound having an alkali metal constituent, may have a single such constituent.

While the organolithium compound functions essentially as a catalyst, it also aids in determining the length of the vinyl pyridine block which will form. Generally, there should be at least 0.002 part of the organolithium compound for each 100 parts of the vinyl pyridine to be polymerized. Most preferably, the catalyst level is from 0.01 to 0.1 part of the organolithium compound for each 100 parts of the vinyl pyridine to be polymerized.

The amount of solvent employed should be sufficient to dissolve each of the reactants during the reaction. Preferably, the concentration of the vinyl pyridine in the solvent is from about 25% to 30%.

After polymerization of the vinyl pyridine with the organolithium compound, the silicone materials are added in order to form the organopolysiloxane block. The organopolysiloxane block is preferably formed by reaction of cyclic organopolysiloxanes, such as hexamethylcyclotrisiloxane, octamethylcyclotetrasiloxane, decamethylcyclopentasiloxane, and hexaphenylcyclotrisiloxane. Of course, mixtures of these materials can be employed in forming the organopolysiloxane blocks. Preferably, when dimethylsiloxy blocks are to be included, the reactant is hexamethylcyclotrisiloxane. The silicone material is generally added to the previously formed vinyl pyridine block in the same solvent as has been employed for forming the vinyl pyridine block. Reaction of the vinyl pyridine in the presence of the organolithium or other alkali metal material generally takes place at about 50°C, with reaction requiring about 2 to 3 hours. The same temperature is generally maintained on addition of the silicone material, while reaction may be completed in 5 hours or less.

If the block copolymer formed is to be one of the AB or ABA type, then following reaction of the silicone material the positively charged lithium ions which are now found at the end of the oganopolysiloxane blocks are removed and the terminals are generally of the type employed in room temperature vulcanizing organopolysiloxane compositions, as are well known in the art, by means known in the art.

If the block copolymers formed are to be of the $(ABA)_x$ type, then the lithium silanolate terminals remain and the compound is reacted with difunctional organosilicon material, such as diphenyldiacetoxysilane. The lithium ion reacts with the acetoxy moiety of the diphenyldiacetoxysilane, and is thus removed from the polymer. The silicone blocks of the polymer are joined by a diphenylsiloxy group through this reaction and, thus, the length of the organopolysiloxane block is, essentially, double. This reaction generally requires about 5 hours at a reaction temperature of about 50°C.

The various block copolymers are removed from the solvent solution and purified through precipitation in a non-solvent. Non-solvents for this purification include water, which acts to remove the soluble lithium acetate which may have formed in the reaction mixture, and higher alkanols such as propanol, butanol, amyl alcohol, etc. The now precipitated block copolymer is recovered by filtering from the solvent mixture.

In order that those skilled in the art may be better enabled to produce the products of the present invention, the following examples are given by way of illustration and not by way of limitation. All parts in the following examples are by weight unless otherwise indicated.

EXAMPLE 1

An ABA type block copolymer was prepared according to this example. Each of the raw materials employed in the reaction was purified prior to reaction. The toluene solvent was distilled from sodium and the tetrahydrofuran solvent from lithium-naphthalene. The hexamethylcyclotrisiloxane was resublimated under reduced pressure, while the 2-vinyl pyridine was redistilled under reduced pressure.

Into a reaction vessel of quantity of 260 parts toluene and 175 parts tetrahydrofuran were charged a quantity of 290 parts of a 0.5 molar dilithium naphthalene solution was added to this solvent mixture and the mixture was stirred and chilled with an ice water mixture. Over the next 3 hours, 85 parts 2-vinyl pyridine were added in small quantities resulting in a red-black, apparently homogeneous mixture. A solution of 60 parts of hexamethylcyclotrisiloxane contained in 130 parts of the same toluenetetrahydrofuran mixture was added and the reaction mixture heated to 60°C and held at that temperature for a period of 3 hours. The color gradually disappeared from the solution, the mixture ultimately becoming a viscous, opaque, off-white mass with a slight violet tinge. The mixture was cooled to room temperature and treated with 1 part of acetic acid in order to provide silanol chain terminals on the copolymer. The mixture was then poured into water so as to precipitate the copolymer from the solvent mixture and the resulting product was a sticky, white crumb which dried to an off-white brittle solid. The copolymer was found to be insoluble in hexane and in toluene. As evidenced by the method of recovery, the polymer was insoluble in water but could be solubilized with dilute mineral acid to a hazy solution. When this solution was treated with an inorganic base, the polymer precipitated. This solubilization and desolubilization effect is demonstrative of the solubilizing effect of the pyridine portion of the copolymer. The polymer had an intrinsic viscosity of 0.29 dl/g, when measured at 25°C in methylethyl ketone. The copolymer had a structure consistent with the formula:

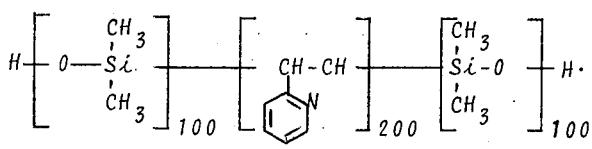

EXAMPLE 2

Reaction is carried out in the same manner as set forth in Example 1, except that 65 parts of 4-vinyl pyridine are used in place of the 2-vinyl pyridine, and 80 parts of hexaphenylcyclotrisiloxane are employed in place of the hexamethylcyclotrisiloxane. The resulting material had a structure consistent with the formula:

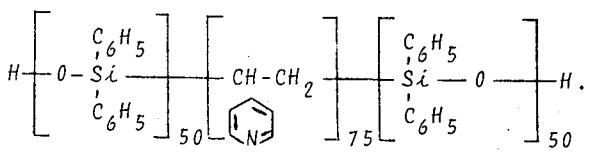

In addition to employing, singly, hexamethylcyclotrisiloxane and hexaphenylcyclotrisiloxane, mixtures of these two cyclic siloxanes can be employed to form a copolymer having mixed dimethylsiloxy and diphenylsiloxy groups.

Following formation of the block copolymer of vinyl pyridine and diorganosiloxy units, the copolymer can be treated with alkylating agents to convert the pyridine nitrogen atoms to positively charged quaternary nitrogen cations, thus increasing the polarity of the vinyl pyridine portion of the copolymer and, thus, its compatibility with polar solvents. The quaternized pyridine portion can be treated with various reagents, including alkylating agents and acids, in order to introduce other substituents into this portion of the molecular, thus forming copolymers of formula:

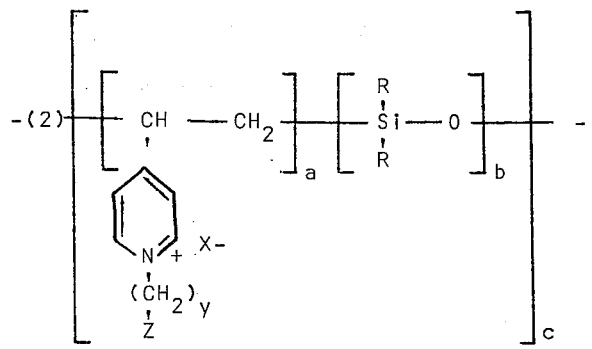

where R, a, b and c are as previously defined, X is a halogen radical such as chlorine, bromine, iodine and fluorine, Z is an organofunctional substituent compatible with the vinyl pyridine system, and y is from 1 to 12. The radicals represented by X can include, for example, chlorine and bromine.

The Z radical is preferably selected from the radicals DCOO—, DO—, $D_2N$—, DHN—, D—, and DS— where D is a non-acidic, non-halogenated monovalent hydrocarbon radical such as an alkyl radical, aryl radical, cycloalkyl radical, aralkyl radical, alkenyl radical and cycloalkenyl radical. Preferably, D has 1 to 12 carbon atoms and more preferably D is an alkyl radical of 1 to 6 carbon atoms such as methyl, ethyl, propyl, etc.

The Z group provides reactivity, in addition to polarity, to this portion of the polymer and thus allows for other reactions and interactions, as are well known in the art. The alkylating agents which may be employed include inorganic acids and other means of quaternization, known to the art. If the quaternizing agent is an alpha, omega-alkylene dihalide, then the block copolymer may be cross-linked through the vinyl pyridine portion, and because of the form of the copolymer, the cross-link density will be very high.

EXAMPLE 3

A solution of 23.6 parts of the copolymer of Example 1 in 200 parts of tetrahydrofuran is stirred in a flask at room temperature while a solution of 17.0 parts of 2-bromoethyl acetate in 50 parts of tetrahydrofuran is added to it. The mixture is stirred and warmed to 50°C for 3 hours, after which the solvent is evaporated under partial vacuum, followed by high-vacuum treatment until all traces of solvent and volatile reagents are gone. The residue is a derivatized copolymer having the structure:

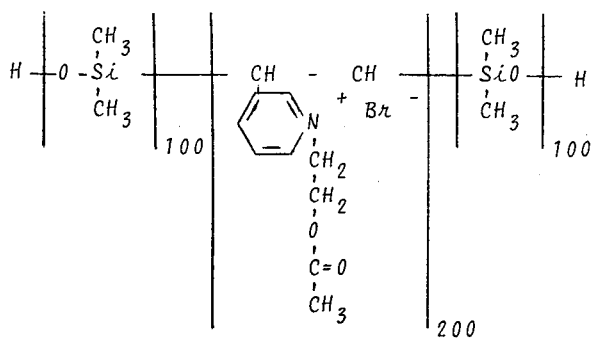

EXAMPLE 4

A solution of 35.4 parts of the copolymer of Example 1 in 250 parts of tetrahydrofuran is stirred in a flask while a solution of 23.0 parts of 2-bromoethyl phenyl ether in 100 parts of tetrahydrofuran is added slowly to it. When the addition is complete, the mixture is stirred and heated to 45° for 2 hours, after which a partial vacuum is applied to evaporate the solvent. Final drying of the product is achieved by warming under the high vacuum provided by a mechanical pump. The dried product is the derivatized copolymer having the structure:

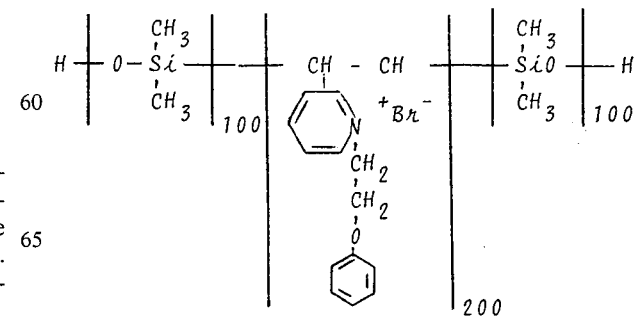

EXAMPLE 5

A fresh solution of (3-diethylamino) propyl chloride in benzene is prepared by agitating together 100 parts of benzene, a solution of 18.6 parts of (3-diethylamino) propyl chloride hydrochloride in 100 parts of water, and a solution of 14.0 parts of potassium carbonate in 50 parts of water. After thorough agitation, the aqueous layer is discarded and the benzene plution is washed once with 25 parts of water, then dried briefly over solid potassium carbonate. This solution is added during a few minutes to a stirred solution of 23.6 parts of the copolymer of Example 1 in 200 parts of tetrahydrofuran. The mixture is warmed to 40°C and stirred for a period of 8 hours; the solvent was then evaporated under reduced pressure and the product dried under high vacuum to remove the last traces of solvent. The product copolymer derivative has the structure:

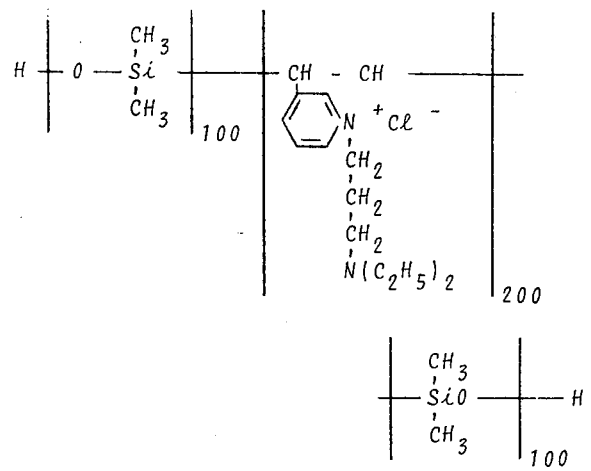

Further treatment with dilute hydrochloric acid can be used to convert the basic dimethylamino functionality to the corresponding hydrochloride, thereby further enhancing the compatibility and solubility of the derivatized silicone copolymer is polar media, such as polar organic solvent, examples of which are alcohols and aqueous alcoholic mixtures.

In order to form copolymers as illustrated in the generic formula

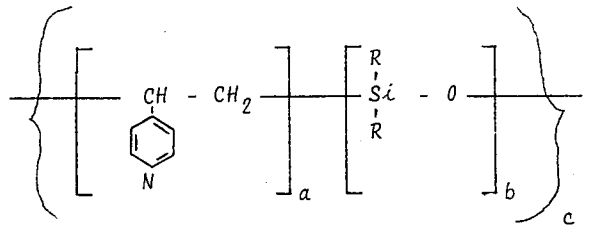

where $c$ is 2 or more, the polymer formed as in Example 1 and 2, is not recovered after reaction of the cyclotrisiloxane to form the initial block copolymer, nor is this material reacted with acetic acid in order to form the silanol chain terminals. Rather, the polymer is left in solution and a quantity of diphenyldiacetoxysilane is added. This material is reacted at about 50°C for about 5 hours in order to form the block copolymer of repeating units. Thus, a small quantity of diphenyldiacetoxysilane is added to the material produced according to Example 2. This material is then treated with acetic acid and recovered in the same manner as recovery of the polymer in Example 1 to form a block copolymer of repeating units of formula:

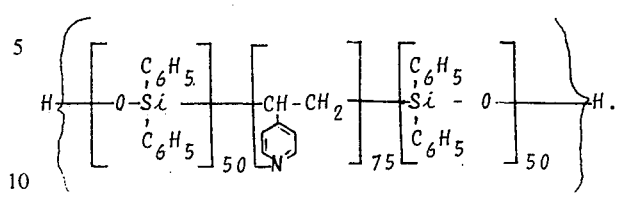

Thus, in effect, the copolymer contains from 3 to 10 groups of 75 4-vinyl pyridine units polymerized, the successive polyvinyl pyridine blocks being interrupted by blocks of 100 diphenylsiloxy units, with the polymer terminated by 50 unit blocks of diphenylsiloxy units, and the chain ultimately terminated by diphenylsilanol groups. Such block copolymers have greater strength and elongation than the simple ABA block copolymers. Of course, these repeating unit block copolymers may also be treated with quaternizing agents in order to provide various advantages as previously set forth for the materials shown in Formula (2). Similarly, the chain terminals on these repeating unit block copolymers may have standard chain terminals as are applied to organopolysiloxane room temperature vulcanizing compositions.

The materials formed according to the present invention are useful as additives to organic plastics, as antistatic treatments for textiles, as additives to silicones, as surfactants in polymeric and non-polymeric systems, as glass-fiber and textile sizes, as primers in surface treatments for metallic and non-metallic materials, the latter including concrete, and for the synthesis of elastomeric membranes containing polar functionality, such as would be employed in permselective membranes.

The terminal groups employable for room temperature vulcanizing compositions may include, for example, acyloxy terminals, silanol terminals, amine terminals, silicon hydride terminals, silicon-vinyl terminals, and other terminals of the type which may be caused to react so as to increase polymer length at room temperature, often upon exposure to atmospheric moisture. Such systems are well known in the art and are taught, for example, in U.S. Pat. No. 2,843,555 - Berridge, U.S. Pat. No. 1,137,495, assigned to the same assignee as the present invention.

While various formulas have been specifically described in this specification, it will be understood that the invention is not so limited, but encompasses the various formulas included in the appended claims.

I claim:

1. A block copolymer of quaternized vinyl pyridine and diorganosiloxy units having the formula:

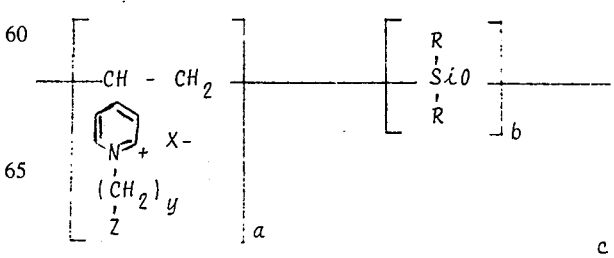

where each R is independently selected from non-acidic, non-halogenated monovalent hydrocarbon radicals, X is a radical selected from the class consisting of chlorine, fluorine, iodine and bromine, Z is a radical selected from the radicals DCOO—, DO—, $D_2N$—, DHN—, D—, and DS— where D is a non-halogenated, non-acidic, monovalent hydrocarbon radical, $a$ is greater than 25, $b$ is greater than 10, $c$ is at least 1, and $y$ is from 1 to 13.

2. The block copolymer of claim 1 wherein $a$ is 50 to 500, and $b$ is from 50 to 500.

3. The block copolymer of claim 1 wherein $c$ is from 3 to 10.

4. The block copolymer of claim 1 wherein R is selected from the class consisting of methyl and phenyl.

5. The block copolymer of claim 1 wherein the vinyl pyridine moiety is 2-vinyl pyridine.

6. The block copolymer of claim 1 wherein Z is DCOO— and D is an alkyl radical of 1 to 12 carbon atoms.

7. The block copolymer of claim 1 wherein Z is DO— and D is an alkyl radical of 1 to 12 carbon atoms.

8. The block copolymer of claim 1 wherein Z is D— and D is an alkyl radical of 1 to 12 carbon atoms.

* * * * *